US009785770B2

United States Patent
Tu et al.

(10) Patent No.: US 9,785,770 B2
(45) Date of Patent: Oct. 10, 2017

(54) METHOD, APPARATUS, AND SYSTEM FOR TRIGGERING VIRTUAL MACHINE INTROSPECTION

(71) Applicant: HUAWEI TECHNOLOGIES CO., LTD., Shenzhen, Guangdong (CN)

(72) Inventors: Bin Tu, Beijing (CN); Haibo Chen, Shanghai (CN); Yubin Xia, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/572,515

(22) Filed: Dec. 16, 2014

(65) Prior Publication Data

US 2015/0186643 A1 Jul. 2, 2015

(30) Foreign Application Priority Data

Dec. 26, 2013 (CN) .......................... 2013 1 0733827

(51) Int. Cl.
*G06F 21/55* (2013.01)
*G06F 21/56* (2013.01)
(Continued)

(52) U.S. Cl.
CPC ........ *G06F 21/554* (2013.01); *G06F 9/45558* (2013.01); *G06F 21/53* (2013.01);
(Continued)

(58) Field of Classification Search
CPC ........ G06F 21/554; G06F 21/53; G06F 21/54; G06F 9/45558; G06F 2221/03; G06F 21/568
See application file for complete search history.

(56) References Cited

U.S. PATENT DOCUMENTS 7,984,304 B1 * 7/2011 Waldspurger ......... G06F 21/565
713/187
8,239,947 B1 * 8/2012 Glick ...................... G06F 21/52
713/1
(Continued)

FOREIGN PATENT DOCUMENTS

CN 102129531 A 7/2011
CN 102147483 A 8/2011

OTHER PUBLICATIONS

"A Virtual Machine Introspection Based Architecture for Intrusion Detection," by Garfinkel and Rosenblum. Proceedings of the Network and Distributed Systems Security Symposium (Feb. 2003).*
(Continued)

*Primary Examiner* — Jung Kim
*Assistant Examiner* — Thomas Ho
(74) *Attorney, Agent, or Firm* — Leydig, Voit & Mayer, Ltd.

(57) ABSTRACT

The present invention discloses a method, an apparatus, and a system for triggering virtual machine introspection, so as to provide a timely and effective security check triggering mechanism. In the present invention, data that needs to be protected is determined; the data that needs to be protected is monitored; and when it is determined that the data that needs to be protected is modified, virtual machine introspection is triggered. The present invention avoids a performance loss and a security problem that are brought about by regularly starting a virtual machine introspection system to perform a security check, and therefore, the present invention is more applicable.

12 Claims, 12 Drawing Sheets

(51) Int. Cl.
*G06F 9/455* (2006.01)
*G06F 21/53* (2013.01)
*G06F 21/54* (2013.01)

(52) U.S. Cl.
CPC ............ *G06F 21/54* (2013.01); *G06F 21/568* (2013.01); *G06F 2009/45587* (2013.01); *G06F 2221/03* (2013.01)

(56) References Cited

U.S. PATENT DOCUMENTS

| | | | | |
|---|---|---|---|---|
| 9,003,402 | B1* | 4/2015 | Carbone | G06F 9/45554 718/1 |
| 2006/0129745 | A1* | 6/2006 | Thiel | G06F 17/30067 711/100 |
| 2008/0320594 | A1* | 12/2008 | Jiang | G06F 21/566 726/24 |
| 2009/0031310 | A1* | 1/2009 | Lev | G06F 11/1405 718/101 |
| 2009/0089879 | A1* | 4/2009 | Wang | G06F 21/53 726/24 |
| 2015/0033227 | A1* | 1/2015 | Lin | G06F 21/55 718/1 |

OTHER PUBLICATIONS

Payne et al., "Lares: An Architecture for Secure Active Monitoring Using Virtualization," 2008 IEEE Symposium on Security and Privacy, pp. 233-247, Institute of Electrical and Electronics Engineers, New York, New York (May 18-22, 2008).

Fu et al., "Space Traveling Across VM: Automatically Bridging the Semantic Gap in Virtual Machine Introspection via Online Kernel Data Redirection," 2012 IEEE Symposium on Security and Privacy, pp. 586-600, Institute of Electrical and Electronics Engineers, New York, New York (May 20-23, 2012).

Liu et al., "Concurrent and Consistent Virtual Machine Introspection with Hardware Transactional Memory," 2014 IEEE 20$^{th}$ International Symposium on High Performance Computer Architecture, Institute of Electrical and Electronics Engineers, New York, New York (Feb. 15-19, 2014).

Leek, "What is Virtual Machine Introspection?" Information Security Stack Exchange, Stack Exchange Inc., security.stackexchange.com/questions/34261/what-is-virtual-machine-introspection (2015).

Birgisson et al., "Enforcing Authorization Policies using Transactional Memory Introspection," Proceedings of the 15$^{th}$ ACM Conference on Computer and Communications Security, pp. 223-234, Association for Computing Machinery, New York, New York (Oct. 2008).

Jana et al., "TxBox: Building Secure, Efficient Sandboxes with System Transactions," 2011 IEEE Symposium on Security and Privacy, pp. 329-344, Institute of Electrical and Electronics Engineers, New York, New York (May 22-25, 2011).

* cited by examiner

METHOD, APPARATUS, AND SYSTEM FOR TRIGGERING VIRTUAL MACHINE INTROSPECTION

CROSS-REFERENCE TO RELATED APPLICATION

This application claims priority to Chinese Patent Application No. 201310733827.9, filed on Dec. 26, 2013, which is hereby incorporated by reference in its entirety.

TECHNICAL FIELD

The present invention relates to the field of virtual machine technologies, and in particular, to a method, an apparatus, and a system for triggering virtual machine introspection.

BACKGROUND

With the popularization of a personal computer, a mobile computing device, and cloud computing in recent years, computer security is increasingly becoming a hot topic attracting people's attention. People save a large amount of key data in various devices, including an email, a personal photo, a bank account and password, a social networking account, and the like, which causes that the devices become hacker's attack targets. How to enhance computer security has become an essential problem to be solved.

VMI (Virtual Machine Introspection, virtual machine introspection) is a method that is applied to a virtualization environment to enhance virtual machine security from the outside of a virtual machine by using a VMM (Virtual Machine Monitor, virtual machine monitor). In this technology, by means of operations such as directly scanning a memory and a disk when the virtual machine runs, and monitoring a network behavior, security operations, for example, an antivirus operation and a network firewall operation, can be performed.

Because of an execution isolation capability of a VMM and a virtual machine on a virtualization platform, the VMM runs outside the virtual machine when the virtual machine introspection technology is applied. Security of the VMM, compared with conventional security software that runs inside the virtual machine, does not rely on the virtual machine itself, and therefore, even though the virtual machine is infected by malware, the malware cannot interfere with execution of the VMM. However, the execution isolation capability of the VMM and the virtual machine also brings about a semantic gap (Semantic Gap) problem, that is, the VMM cannot learn internal semantic meaning of the virtual machine, which brings a great challenge to an application in which the virtual machine introspection technology is used to enhance virtual machine security.

VMI system attempts to use different methods to narrow a semantic gap as much as possible, and a relatively important one of various semantic gap problems is how to choose an occasion of triggering virtual machine introspection. Generally, the following manner is mainly used in the VMI system to trigger virtual machine introspection.

By setting a fixed time interval, the VMI system is regularly triggered to perform a security check. An advantage is that this method is easy to implement without a need to trigger the VMI system according to specific semantic information. However, in a regular-check solution, performance and security must be balanced. If a time interval of the check is set extremely long, it may cause that some attacks that should have been detected successfully are missed, or some attacks are detected only after the attacks succeed, and consequently, an irreparable loss may be caused, such as disclosure of confidential data. If a time interval of the check is set extremely short, an additional load of the system may be greatly increased, thereby affecting normal execution and weakening availability of the system.

Therefore, it is imperative to provide a timely and effective security check triggering mechanism in the VMI system.

SUMMARY

Embodiments of the present invention provide a method, an apparatus, and a system for triggering virtual machine introspection, so as to provide a timely and effective security check triggering mechanism.

According to a first aspect, an embodiment of the present invention provides a method for triggering virtual machine introspection, including:

determining data that needs to be protected;

monitoring the data that needs to be protected; and triggering virtual machine introspection when it is determineed that the data that needs to be protected is modified.

With reference to the first aspect, in a first implementation manner, before the monitoring the data that needs to be protected, the method includes:

storing, in a read set of a hardware transactional memory, a memory address corresponding to the determined data that needs to be protected; and the monitoring the data that needs to be protected includes:

monitoring the data that needs to be protected and corresponds to the memory address stored in the read set.

With reference to the first aspect or the first implementation manner of the first aspect, in a second implementation manner of the first aspect, before the monitoring the data that needs to be protected, the method further includes:

saving a copy of the data that needs to be protected;

the triggering virtual machine introspection includes:

locating a memory address of modified data; and after the triggering virtual machine introspection, the method further includes:

restoring the modified data according to the copy and the located memory address of the modified data.

With reference to the first aspect, the first implementation manner of the first aspect, or the second implementation manner of the first aspect, in a third implementation manner of the first aspect, after the triggering virtual machine introspection, the method further includes:

canceling monitoring of the data that needs to be protected.

With reference to the first aspect, the first implementation manner of the first aspect, the second implementation manner of the first aspect, or the third implementation manner of the first aspect, in a fourth implementation manner of the first aspect, after the triggering virtual machine introspection, the method further includes:

sending an alarm prompt to a virtual machine user, so that the user performs a security check.

According to a second aspect, an embodiment of the present invention provides an apparatus for triggering virtual machine introspection, including: a determining unit, a monitoring unit, and a triggering unit, where:

the determining unit is configured to determine data that needs to be protected;

the monitoring unit is configured to monitor the data that needs to be protected and is determined by the determining unit; and the triggering unit is configured to trigger virtual machine introspection when the monitoring unit determines that the data that needs to be protected is modified.

With reference to the second aspect, in a first implementation manner of the second aspect, the apparatus further includes a storing unit, where:

the storing unit is configured to store, in a read set of a hardware transactional memory, a memory address corresponding to the data that needs to be protected and is determined by the determining unit; and the monitoring unit is specifically configured to:

monitor the data that needs to be protected and corresponds to the memory address stored in the read set by the storing unit.

With reference to the second aspect or the first implementation manner of the second aspect, in a second implementation manner of the second aspect, the apparatus further includes: a saving unit and a restoring unit, where:

the saving unit is configured to save a copy of the data that needs to be protected and is determined by the determining unit;

the triggering unit is specifically configured to:

locate a memory address of modified data; and the restoring unit is configured to restore the modified data according to the copy saved by the saving unit and the memory address of the modified data, where the memory address of the modified data is located by the triggering unit.

With reference to the second aspect, the first implementation manner of the second aspect, or the second implementation manner of the second aspect, in a third implementation manner of the second aspect, the apparatus further includes a canceling unit, where:

the canceling unit is configured to, when the triggering unit triggers the virtual machine introspection, cancel monitoring of the data that needs to be protected.

With reference to the second aspect, the first implementation manner of the second aspect, the second implementation manner of the second aspect, or the third implementation manner of the second aspect, in a fourth implementation manner of the second aspect, the apparatus further includes an alarm unit, where:

the alarm unit is specifically configured to, when the triggering unit triggers the virtual machine introspection, send an alarm prompt to a virtual machine user, so that the user performs a security check.

According to a third aspect, an embodiment of the present invention provides a system for triggering virtual machine introspection, including a hardware transactional memory and the apparatus for triggering virtual machine introspection according to any one of the implementation manners of the foregoing second aspect, where:

the hardware transactional memory is configured to monitor the data that needs to be protected and is determined by the apparatus for triggering virtual machine introspection; and the apparatus for triggering virtual machine introspection is configured to trigger virtual machine introspection when the hardware transactional memory determines that the data that needs to be protected is modified.

According to the method, the apparatus, and the system for triggering virtual machine introspection that are provided in the embodiments of the present invention, determined data that needs to be protected is monitored; and when it is determineed that the data that needs to be protected is modified, virtual machine introspection is triggered. In this way, virtual machine introspection can be timely triggered, and a time interval for performing a security check does not need to be set, thereby avoiding a performance loss and a security problem that are brought about during a regular check.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

A hardware transactional memory (Hardware Transactional Memory, HTM) has a characteristic of redirecting a program to a memory access violation processing program in a case of a multicore memory access violation, and a specific execution process is as follows:

```
stat = xbegin( )
if (stat == OK)
{
transaction program
...
...
...
xend( )
}
else
{
memory access violation processing program
}
```

In the foregoing processing process, a transaction (Transaction) begins to be executed by using an xbegin instruction. During execution of the transaction, all read memory addresses are recorded by hardware into a read set (Read Set); and all written memory addresses are also recorded by hardware into a write set (Write Set). Before the transaction ends, all write operations are visible to a program inside the transaction, but are invisible to the outside of the transaction.

In an execution process of the transaction, if another processor modifies stored data that corresponds to a memory address in the read set of the transaction, or reads a memory address in the write set of the transaction, it indicates that a memory access violation occurs. The program is redirected to the memory access violation processing program, and the transaction is aborted (Transaction Abort).

An xend instruction may be used to end running (Transaction Commit) of the entire transaction that begins to be executed by using the xbegin instruction, and may be used to make a write operation take effect at the same time and visible to the outside.

In the embodiments of the present invention, a characteristic that a hardware transactional memory can redirect a program to a memory access violation processing program in a transaction execution process is applied; and a functional module of the hardware transactional memory is added to a VMI (Virtual Machine Introspection, virtual machine introspection) system, and a data protection transaction is executed by using the hardware transactional memory function, so as to perform data protection on data that needs to be protected. When the data is modified, virtual machine introspection is triggered.

Figure 1A:
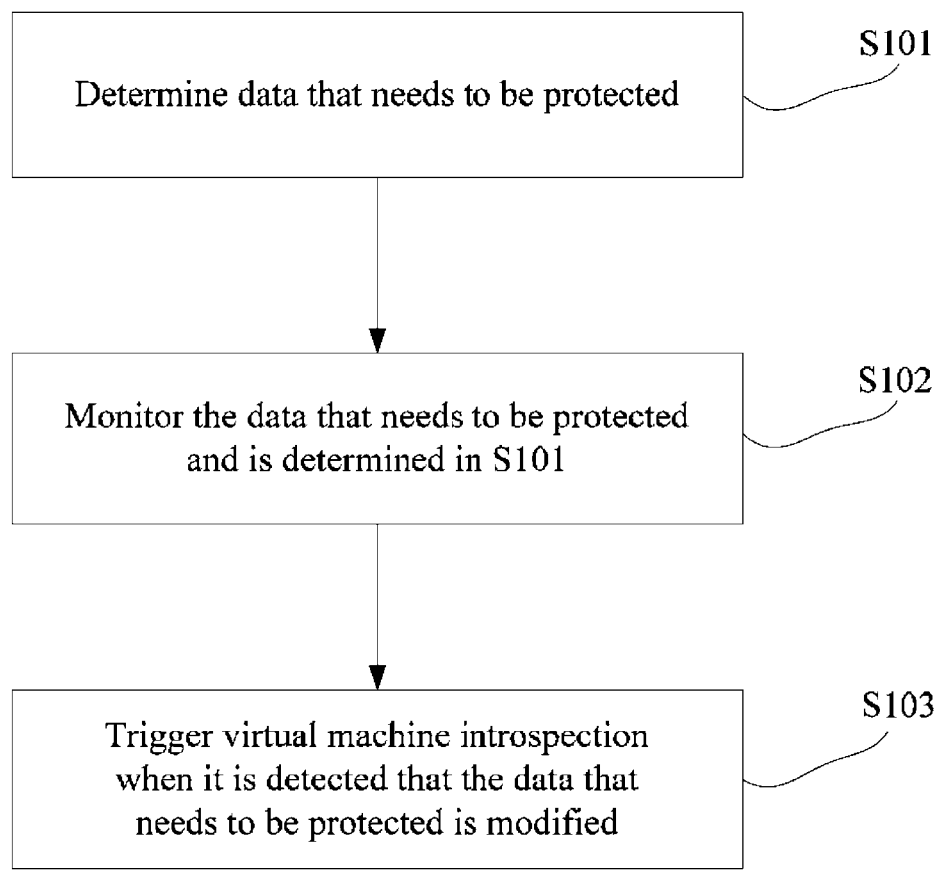
FIG. 1A-FIG. 1B are a flowchart of a method for triggering virtual machine introspection according to an embodiment of the present invention.

FIG. 1A is a flowchart of a method for triggering virtual machine introspection according to an embodiment of the present invention, where the method specifically includes:

S101: Determine data that needs to be protected.

A VMI system generally protects key data in a virtual machine from being tampered with, for example, protects integrity of data, such as a system call table, an interrupt vector table, and a key function pointer table of a kernel. Data that needs to be protected in this embodiment of the present invention includes but is not limited to the foregoing related data, for example, may also be module data.

S102: Monitor the data that needs to be protected and is determined in S101.

Specifically, in this embodiment of the present invention, a hardware transactional memory function is added to the VMI system, and the determined data that needs to be protected is monitored by using a transaction processing program of a hardware transactional memory, so as to execute data protection.

S103: Trigger virtual machine introspection when the data that needs to be protected is modified.

According to this embodiment of the present invention, after data that needs to be protected is determined, the data that needs to be protected is monitored; and when it is determineed that the data that needs to be protected is modified, virtual machine introspection is triggered, which can timely trigger virtual machine introspection.

Optionally, before S102 is performed in this embodiment of the present invention, a memory address corresponding to the determined data that needs to be protected may be stored in a read set of the hardware transactional memory, and the data that needs to be protected is monitored by using the hardware transactional memory, so as to execute data protection.

In this embodiment of the present invention, the transaction processing program of the hardware transactional memory may execute data protection in the following manner:

S1021: Start a hardware transactional memory.

Specifically, in this embodiment of the present invention, the hardware transactional memory may be controlled, by using an xbegin instruction, to begin to execute a transaction, that is, a data protection transaction of executing data protection on the data that needs to be protected. A transaction processing program of the transaction is used to perform security protection on the data that needs to be protected and is determined in S101.

S1022: Read the data that needs to be protected, and store, in a read set of the hardware transactional memory, a memory address corresponding to the read data that needs to be protected.

In this embodiment of the present invention, in a started data protection transaction, the data that needs to be protected is read, which enables the hardware transactional memory to automatically store, in a read set of a hardware transaction, the memory address corresponding to the read data that needs to be protected.

S1023: Monitor the data that needs to be protected and corresponds to the memory address stored in the read set.

In this embodiment of the present invention, the hardware transactional memory can monitor whether a write operation is executed on stored data corresponding to the memory address that is stored in the read set.

The read set of the hardware transactional memory can automatically record the memory address corresponding to the data that needs to be protected and is read by the VMI system, and a write operation is not allowed to be executed on the stored data corresponding to the memory address recorded in the read set. When it is determineed that a write operation is executed on the stored data corresponding to the memory address stored in the read set, it is determined that the data corresponding to the memory address is modified, and the step of triggering virtual machine introspection in S103 is performed.

Performing the step of triggering virtual machine introspection in S103 specifically includes:

S1030: Trigger the virtual machine introspection when it is determined that a write operation is executed on the data that needs to be protected.

In this embodiment of the present invention, a write operation that is executed on data may include data deletion, or adding data content to data or deleting data content from data. When the foregoing operation is executed on the data that needs to be protected, it is determined that the data corresponding to the memory address is modified.

In this embodiment of the present invention, in a VMI system, a memory access violation processing program of a hardware transactional memory is set as a program for triggering virtual machine introspection. When it is determined that a write operation is executed on data that needs to be protected, a transaction processing program of the hardware transactional memory may be controlled to be redirected to the program for triggering virtual machine introspection, and a security check is performed according to a preset security check program.

Figure 1B:
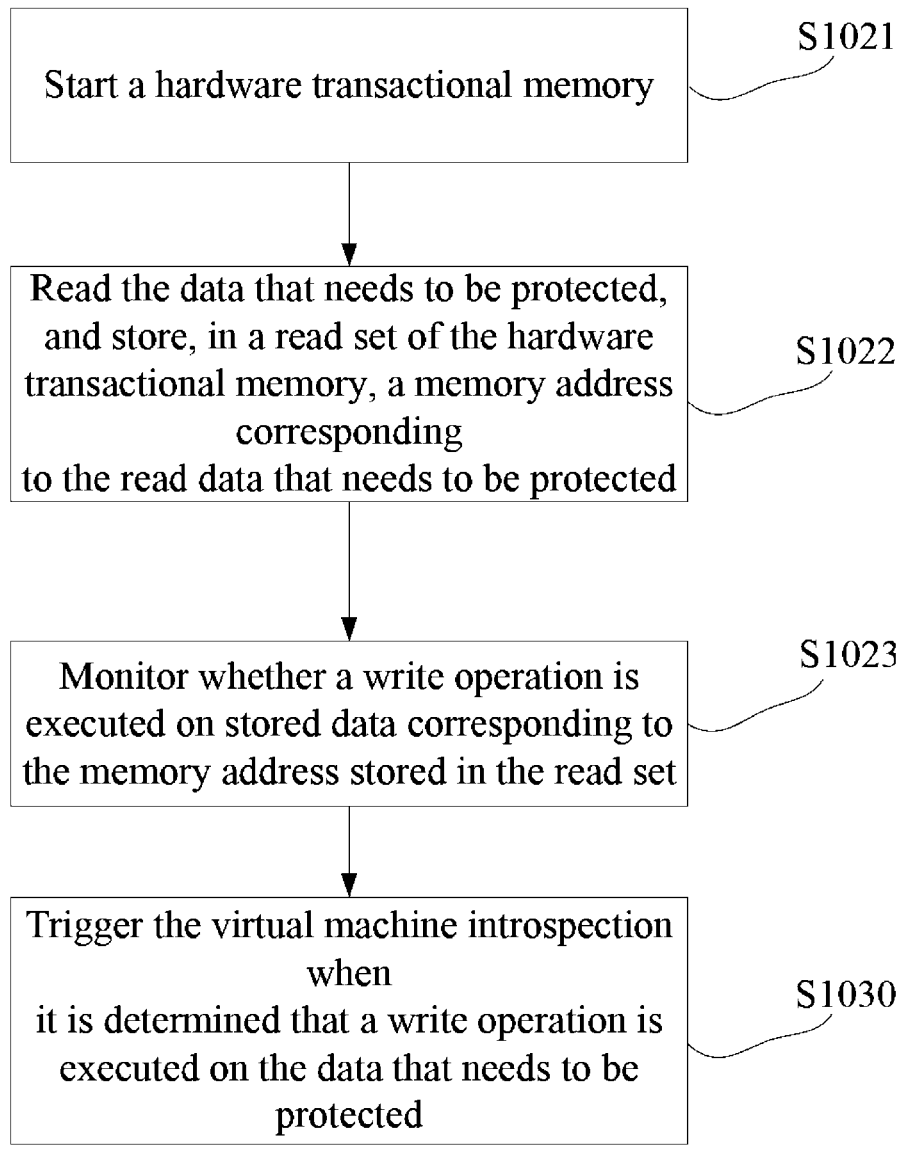

For the foregoing process of triggering virtual machine introspection in this embodiment of the present invention, reference may be made to FIG. 1B.

Figure 2A:
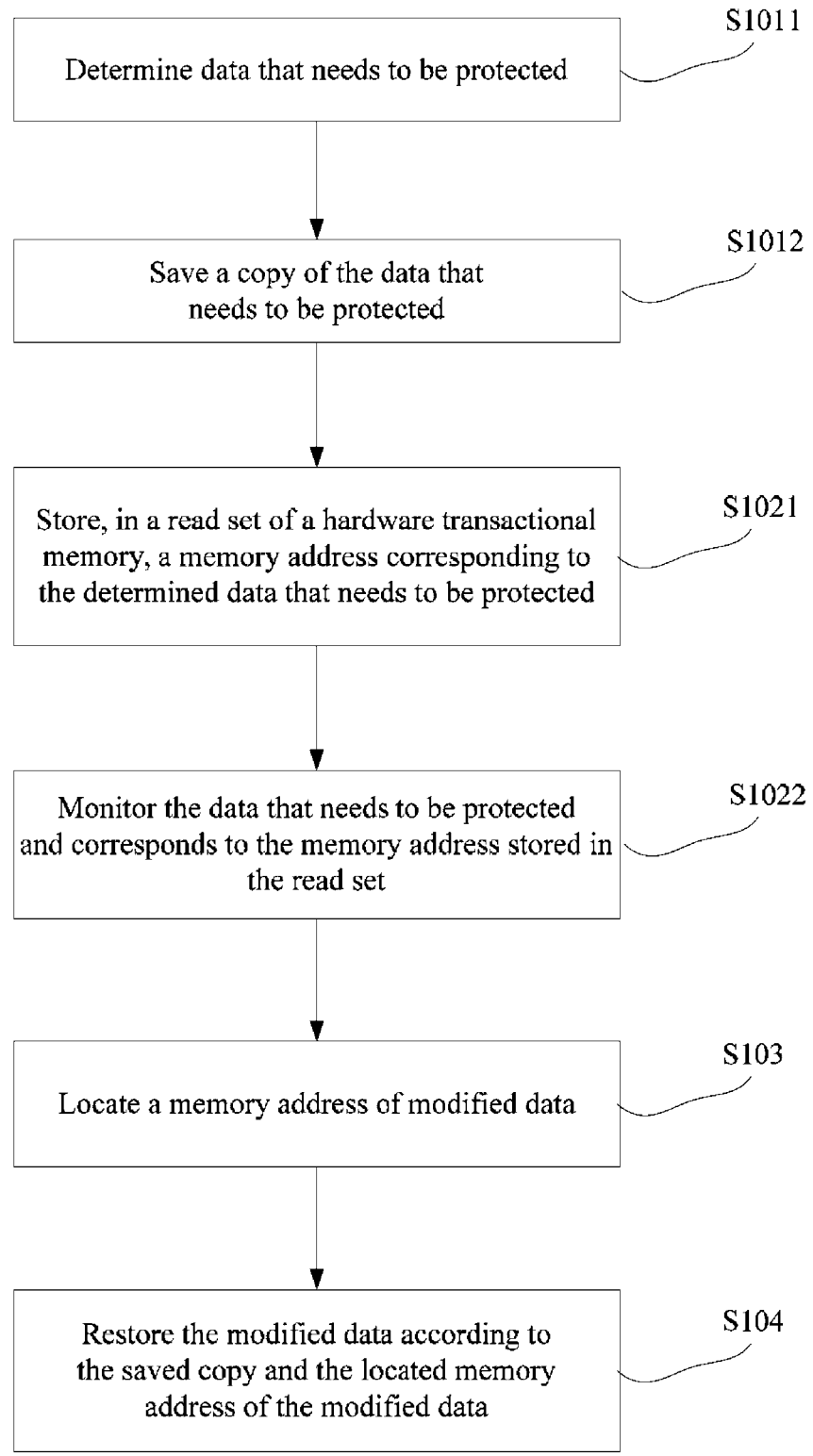
FIG. 2A-FIG. 2C are schematic diagrams of a process of triggering virtual machine introspection and performing a security check according to an embodiment of the present invention.

Further, in this embodiment of the present invention, before S102 of monitoring the data that needs to be protected is performed, a copy of the data that needs to be protected may be saved, for example, the copy of the data that needs to be protected is saved outside the virtual machine. In this embodiment of the present invention, a specific process of performing the step of triggering virtual machine introspection in S103 may be implemented by locating a memory address of modified data. When a security check is performed after the virtual machine introspection is triggered, the modified data is to be restored according to the saved copy and the located memory address of the modified data, and a specific implementation process, as shown in FIG. 2A, includes:

S1011: Determine data that needs to be protected.

S1012: Save a copy of the data that needs to be protected.

S1021: Store, in a read set of a hardware transactional memory, a memory address corresponding to the determined data that needs to be protected.

S1022: Monitor the data that needs to be protected and corresponds to the memory address stored in the read set.

S103: Locate a memory address of modified data.

S104: Restore the modified data according to the saved copy and the located memory address of the modified data.

In this embodiment of the present invention, the foregoing implementation process of using the hardware transactional memory to trigger VMI and perform a security check may be implemented in the following manner

```
save a copy of data that needs to be protected
stat = xbegin( )
if (stat == OK)
{
read all the data that needs to be protected
infinite loop
...
}
else
{
security check program
}
```

Figure 2B:
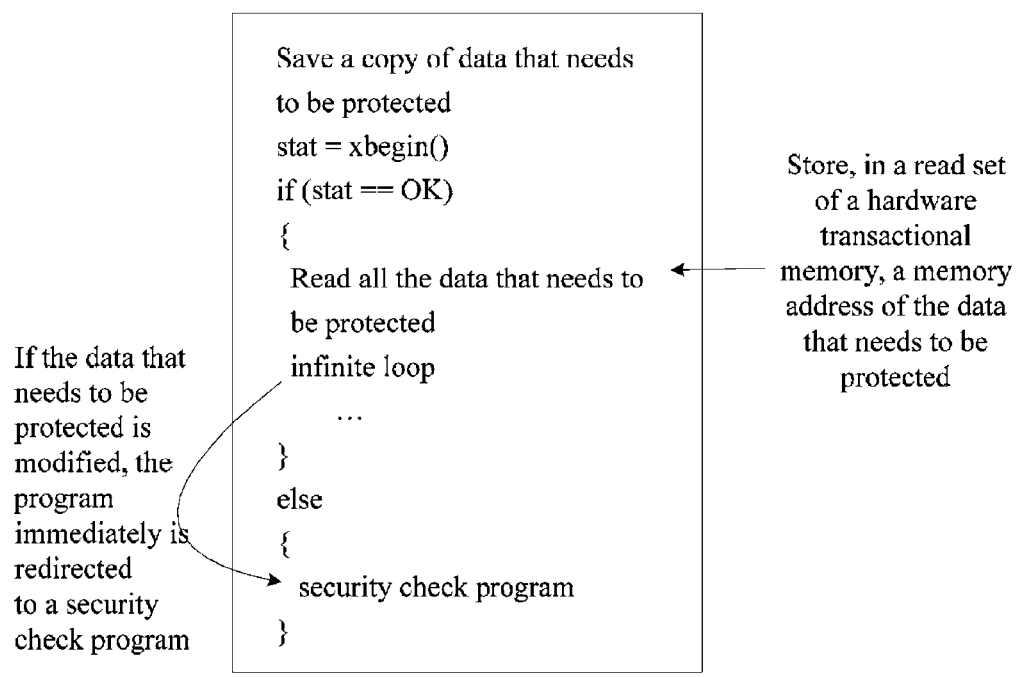

A schematic diagram of specific implementation of the foregoing implementation process is shown in FIG. 2B.

Optionally, in this embodiment of the present invention, after a hardware transactional memory enables a data protection transaction, data that needs to be protected is monitored. If the data that needs to be protected in the data protection transaction is not modified, the data protection transaction keeps running; if the data that needs to be protected in the data protection transaction is modified, virtual machine introspection is triggered, so as to locate a modified memory address. In this embodiment of the present invention, after the virtual machine introspection is triggered, monitoring the data that needs to be protected may further be canceled, so as to reduce resource occupancy. In this embodiment of the present invention, after the virtual machine introspection is triggered, an alarm prompt may further be sent to a virtual machine user, so that the user performs a security check. When performing the security check, the user may restore the modified data according to the saved copy and the modified memory address that is located. In this embodiment of the present invention, a related process of triggering virtual machine introspection and performing a security check is shown in FIG. 2C.

Figure 2C:
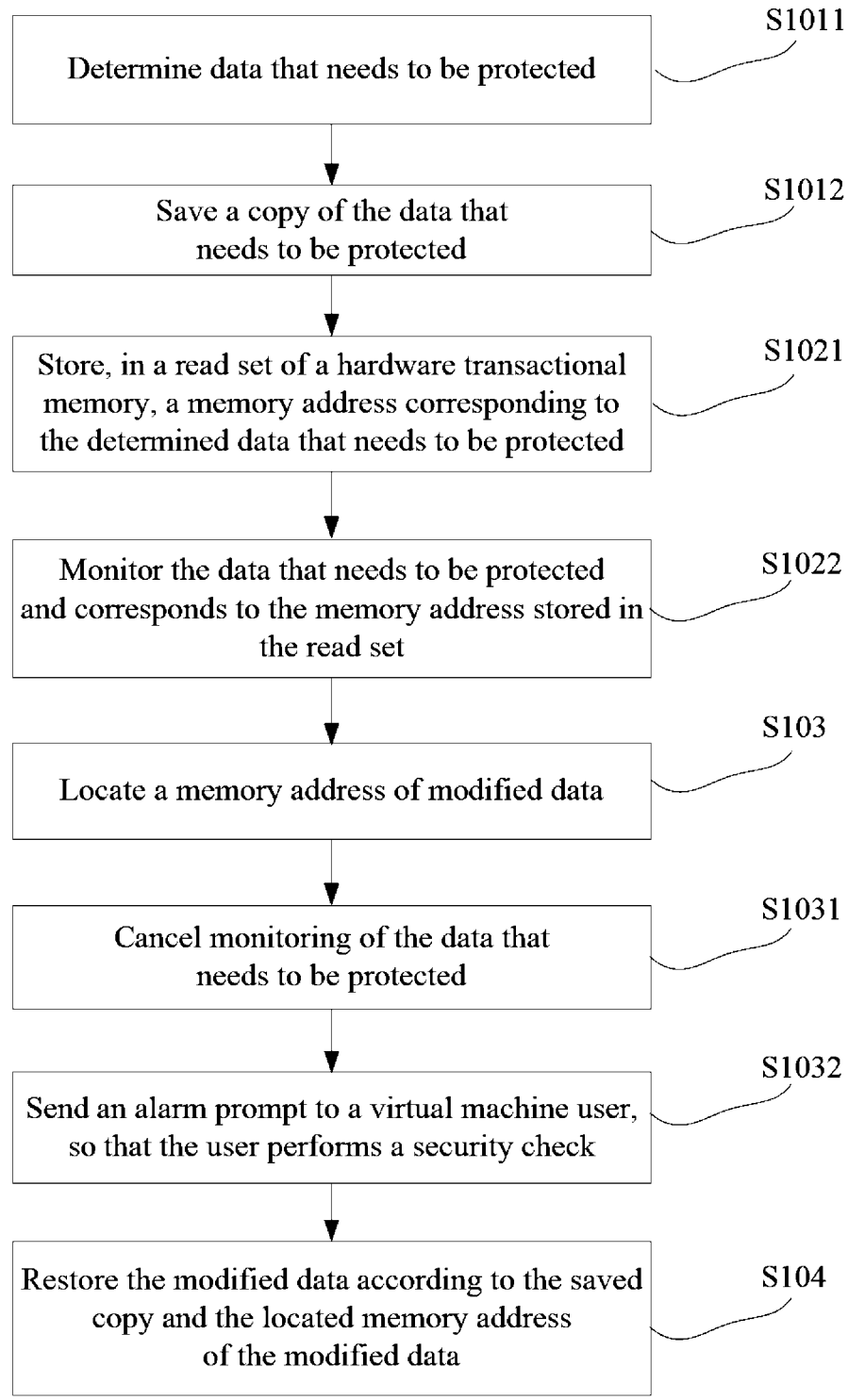

FIG. 2C is based on FIG. 2A, and after S103 of locating a memory address of modified data, the method includes:

S1031: Cancel monitoring of the data that needs to be protected.

S1032: Send an alarm prompt to a virtual machine user, so that the user performs a security check.

In this embodiment of the present invention, the hardware transactional memory may be controlled to cancel data protection executed on the data that needs to be protected, that is, to cancel a process of the data protection transaction. By monitoring time at which the hardware transactional memory cancels the process of the executed data protection transaction, time at which the data is modified can be timely detected.

It can be learned from the foregoing that because in this embodiment of the present invention, virtual machine introspection can be triggered when it is detected that a process of a data protection transaction is aborted, a performance loss caused by regularly enabling VMI to perform a security check is reduced, and at the same time, security of a virtual machine is also enhanced.

With reference to a practical application, the foregoing related process of using a hardware transactional memory to trigger virtual machine introspection and perform a security check is described in detail in the following embodiments of the present invention.

In an embodiment of the present invention, protecting a system call table is used as an example for description. A system call table is an important data structure of an operating system and is also a data structure that malware (such as Rootkit) often tampers with. VMI checks correctness of a currently used system call table to ensure that the system call table is not tampered with.

Figure 3:
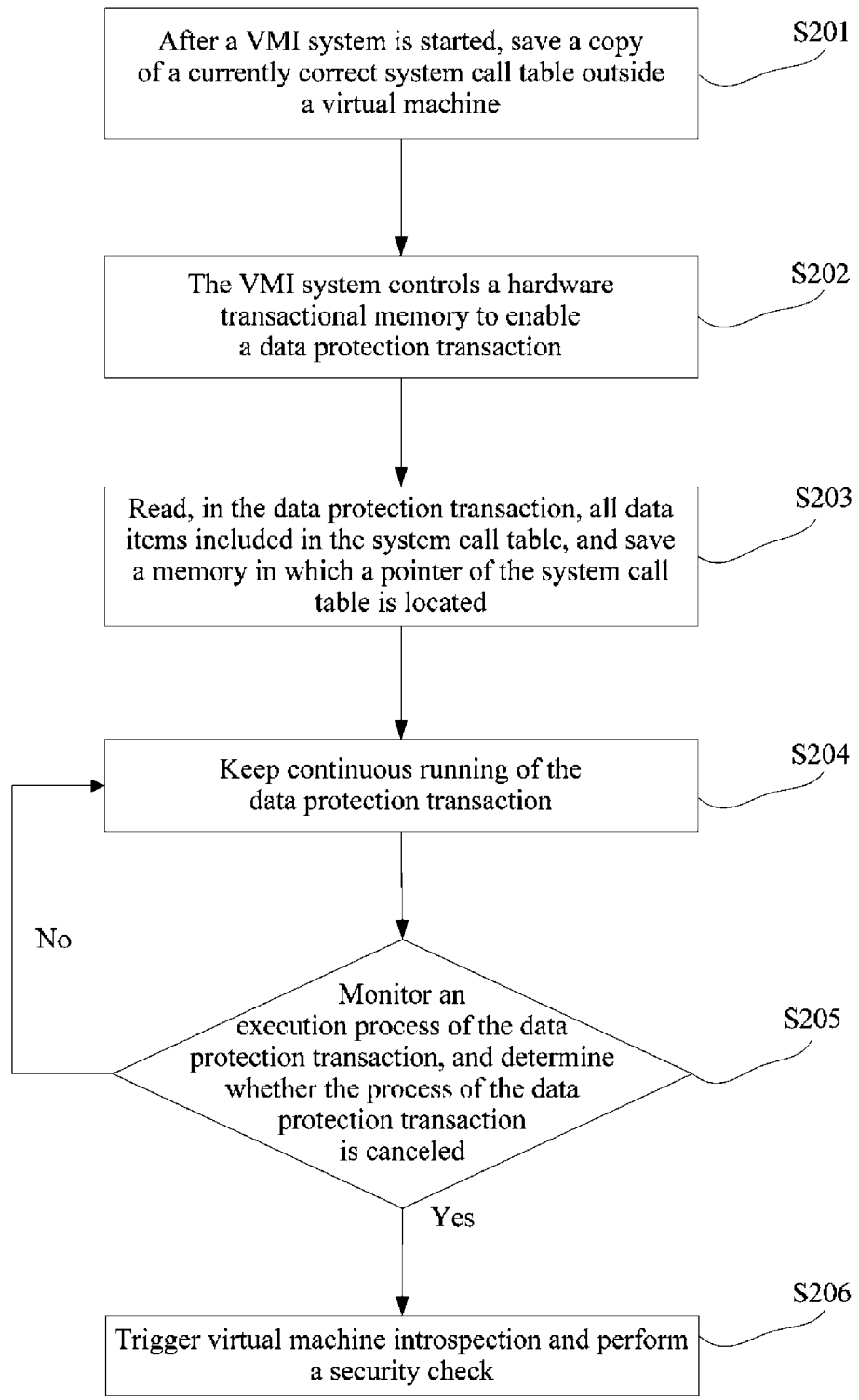
FIG. 3 is another flowchart of triggering virtual machine introspection according to an embodiment of the present invention.

A specific process of using a hardware transactional memory to trigger virtual machine introspection and perform a security check, as shown in FIG. 3, includes:

S201: After a VMI system is started, save a copy of a currently correct system call table outside a virtual machine.

S202: The VMI system controls a hardware transactional memory to enable a data protection transaction.

S203: Read, in the data protection transaction, all data items included in the system call table, and save a memory in which a pointer of the system call table is located.

Specifically, in a process in which the VMI system reads the system call table, all read memory addresses are automatically recorded by the hardware transactional memory into a read set.

S204: Keep continuous running of the data protection transaction.

S205: Monitor an execution process of the data protection transaction, and determine whether the process of the data protection transaction is aborted.

Specifically, in this embodiment of the present invention, if the system call table is not modified, S204 is performed to keep continuous running of the data protection transaction; and if the system call table is modified, the hardware transactional memory aborted the data protection transaction, and S206 is performed.

S206: Trigger virtual machine introspection and perform a security check.

In this embodiment of the present invention, after code may be defined in a transaction processing abort program of the hardware transactional memory to abort the data protection transaction, the transaction processing abort program is redirected to a security check program, so as to implement trigger of a security check.

When the security check is performed, by comparing the modified data with the correct copy that is saved, a data item that is modified may be located and restored, and an alarm may be sent to an administrator; or a memory access process that causes the process of the data protection transaction to be aborted is determined, and running of the memory access process is stopped to wait for administrator's processing.

It can be learned from the foregoing that because in this embodiment of the present invention, when it is detected that a process of a data protection transaction is aborted, virtual machine introspection can be triggered and locating can be performed according to a saved copy and modified data, a performance loss caused by regularly enabling VMI to perform a security check is reduced, and at the same time, security of a virtual machine is also enhanced.

In another embodiment of the present invention, a process of loading a protection module is used as an example for description. Another common manner in which malware attacks is to insert the malware into a kernel in a module manner, so as to execute malicious code. Therefore, in this embodiment of the present invention, a VMI system may perform a security check at a moment when a new module is inserted.

Figure 4:
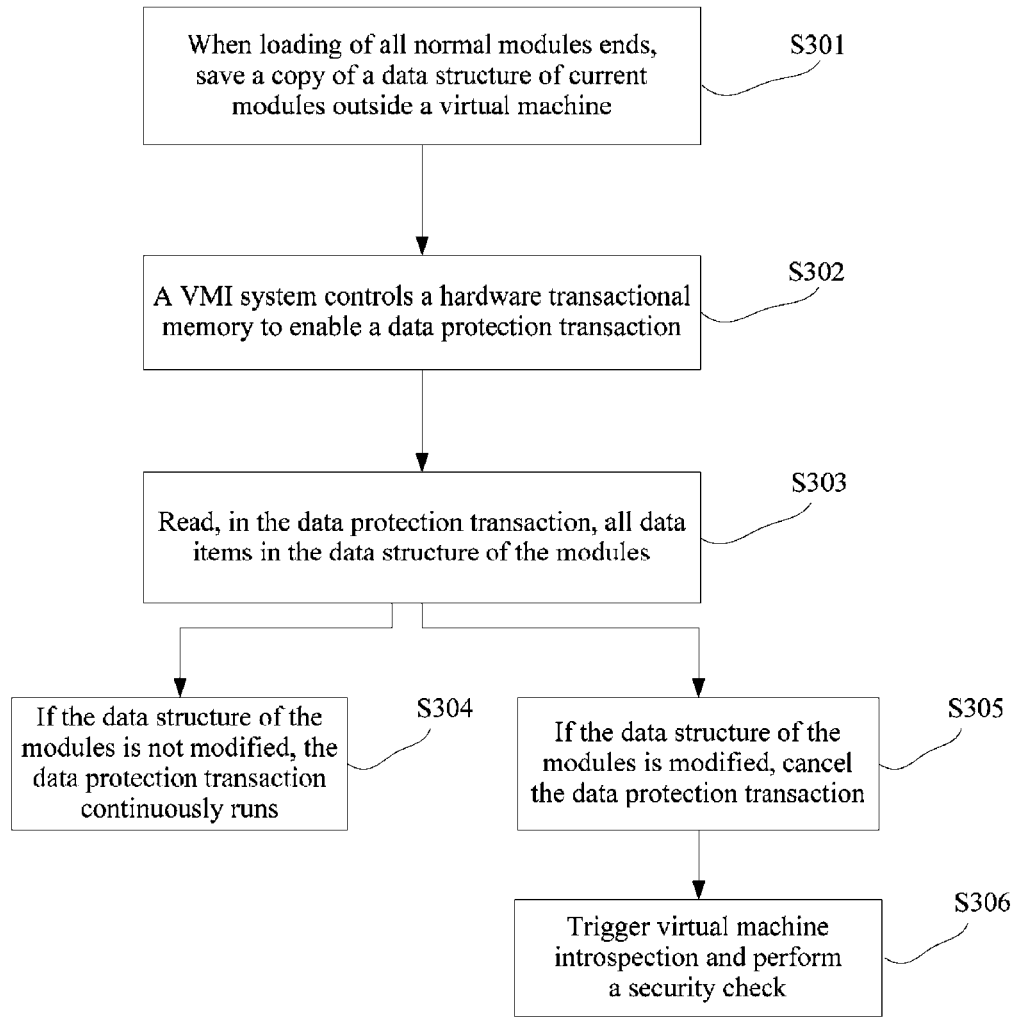
FIG. 4 is another flowchart of triggering virtual machine introspection according to an embodiment of the present invention.

In this embodiment of the present invention, a specific process of using a hardware transactional memory to trigger virtual machine introspection, as shown in FIG. 4, includes:

S301: After a VMI system is started, when loading of all normal modules ends, the VMI system first saves a copy of a data structure of current modules (modules) outside a virtual machine, where the data structure records all modules that are running in the system currently.

S302: The VMI system controls a hardware transactional memory to enable a data protection transaction.

S303: Read, in the data protection transaction, all data items in the data structure of the modules.

In a process of reading all the data items in the data structure of the modules, all read memory addresses are automatically recorded by the hardware transactional memory into a read set.

S304: If the data structure of the modules is not modified, the data protection transaction continuously runs.

S305: If the data structure of the modules is modified, abort the data protection transaction.

S306: Trigger virtual machine introspection and perform a security check.

When the security check is performed, by comparing the modified data and the correct copy, a newly added module is determined, and a security check is performed on the module. If the module passes the check, the data protection transaction continuously runs, and otherwise an administrator is notified; or a memory access process that causes a process of the data protection transaction to be aborted is determined, and running of the memory access process is stopped to wait for administrator's processing.

In this embodiment of the present invention, determined data that needs to be protected is monitored; and when it is determineed that the data that needs to be protected is modified, virtual machine introspection is triggered, which can timely trigger the virtual machine introspection. Further, in this embodiment of the present invention, by using a characteristic that transaction abort occurs in a hardware transactional memory in a case in which a multicore memory access violation exists, data that needs to be protected is read into a read set of the hardware transactional memory in advance; the data that needs to be protected is monitored by using the hardware transactional memory; and when the data is modified, the hardware transactional memory aborts a data protection transaction in a transaction processing program, and triggers a virtual machine introspection program to perform a security check on the data that needs to be protected, thereby ensuring validity of the check. According to the present invention, in one aspect, it can be implemented that a security check is performed at a moment when data is modified, thereby avoiding a performance loss and a security problem that are brought about during a regular check; in another aspect, a memory address corresponding to the data that needs to be protected is saved in the read set, and because the hardware transactional memory has a characteristic of an extremely large read set, as long as the data that needs to be protected is read and recorded into the read set, security protection for the data can be implemented, where no limitation is constructed on data that VMI protects; and in still another aspect, in this embodiment of the present invention, a guest operating system does not need to be modified, and this embodiment of the present invention does not rely on security of the guest operating system, thereby enhancing applicability and security of the VMI system.

Figure 5A:
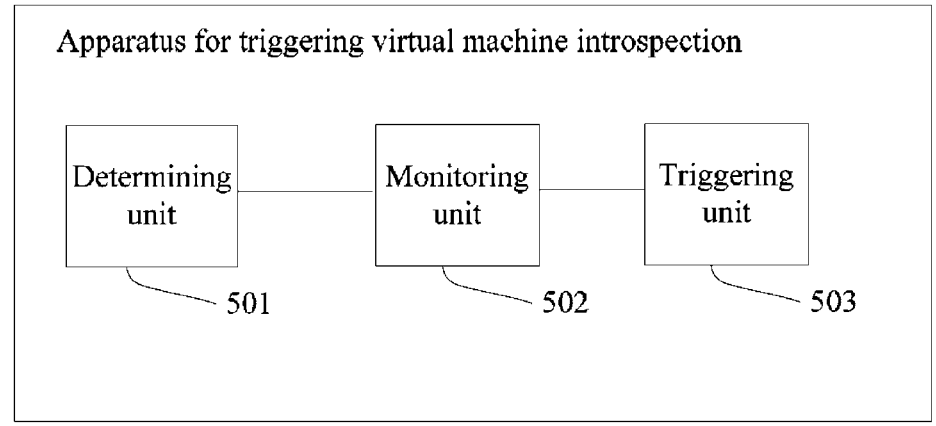
FIG. 5A-FIG. 5E are schematic composition diagrams of an apparatus for triggering virtual machine introspection according to an embodiment of the present invention.

The present invention further provides an apparatus for triggering virtual machine introspection. As shown in FIG. 5A, the apparatus includes: a determining unit 501, a monitoring unit 502, and a triggering unit 503, where:

the determining unit 501 is configured to determine data that needs to be protected;

the monitoring unit 502 is configured to monitor the data that needs to be protected and is determined by the determining unit 501; and the triggering unit 503 is configured to trigger virtual machine introspection when the monitoring unit 502 determines that the data that needs to be protected is modified.

Figure 5B:
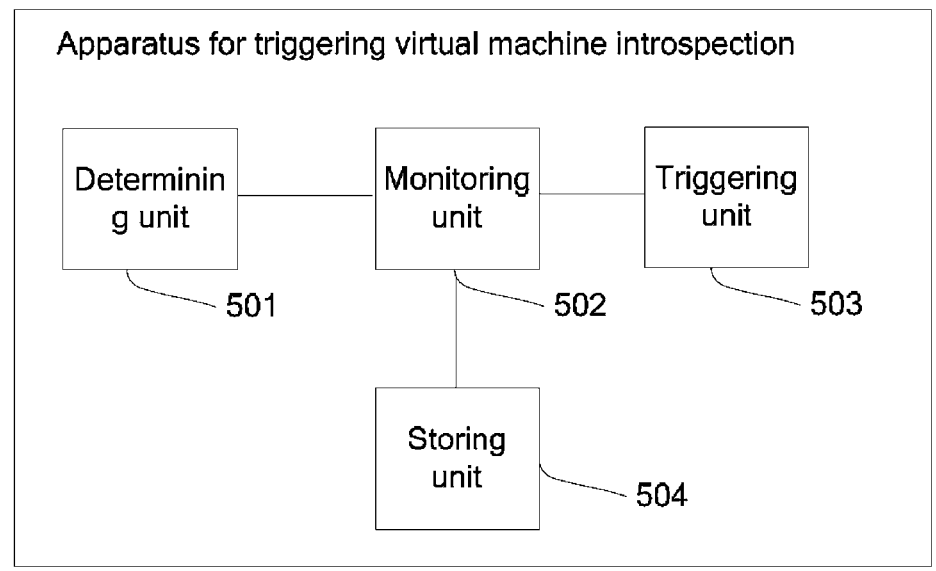

With reference to the foregoing related apparatus for triggering virtual machine introspection, the apparatus further includes a storing unit 504. As shown in FIG. 5B, the storing unit 504 is specifically configured to:

store, in a read set of a hardware transactional memory, a memory address corresponding to the data that needs to be protected and is determined by the determining unit 501; and the monitoring unit 502 is specifically configured to:

monitor the data that needs to be protected and corresponds to the memory address stored in the read set by the storing unit 504.

Figure 5C:
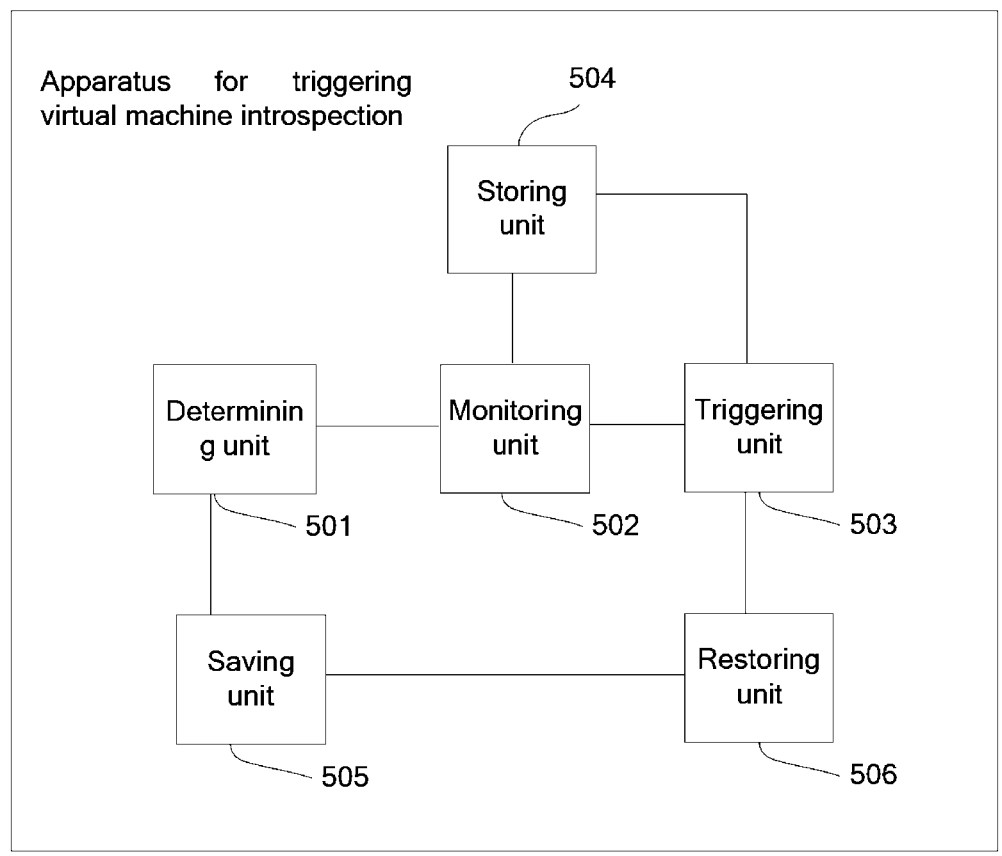

Further, the related apparatus in this embodiment of the present invention further includes a saving unit 505 and a restoring unit 506, as shown in FIG. 5C, where:

the saving unit 505 is configured to save a copy of the data that needs to be protected and is determined by the determining unit 501;

the triggering unit 503 is specifically configured to locate a memory address of modified data; and the restoring unit 506 is configured to restore the modified data according to the copy saved by the saving unit 505 and the memory address of the modified data, where the memory address of the modified data is located by the triggering unit 503.

Figure 5D:
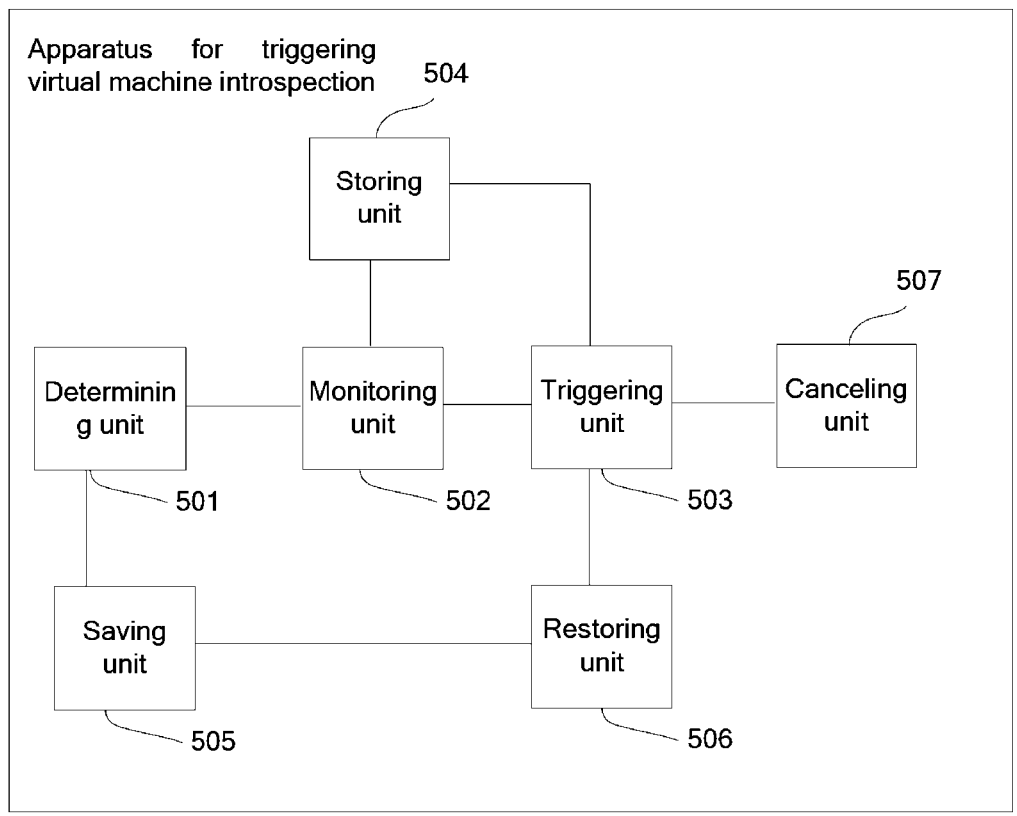

Further, the apparatus further includes a canceling unit 507, as shown in FIG. 5D, where:

the canceling unit 507 is configured to, when the triggering unit 503 triggers the virtual machine introspection, cancel monitoring of the data that needs to be protected.

Figure 5E:
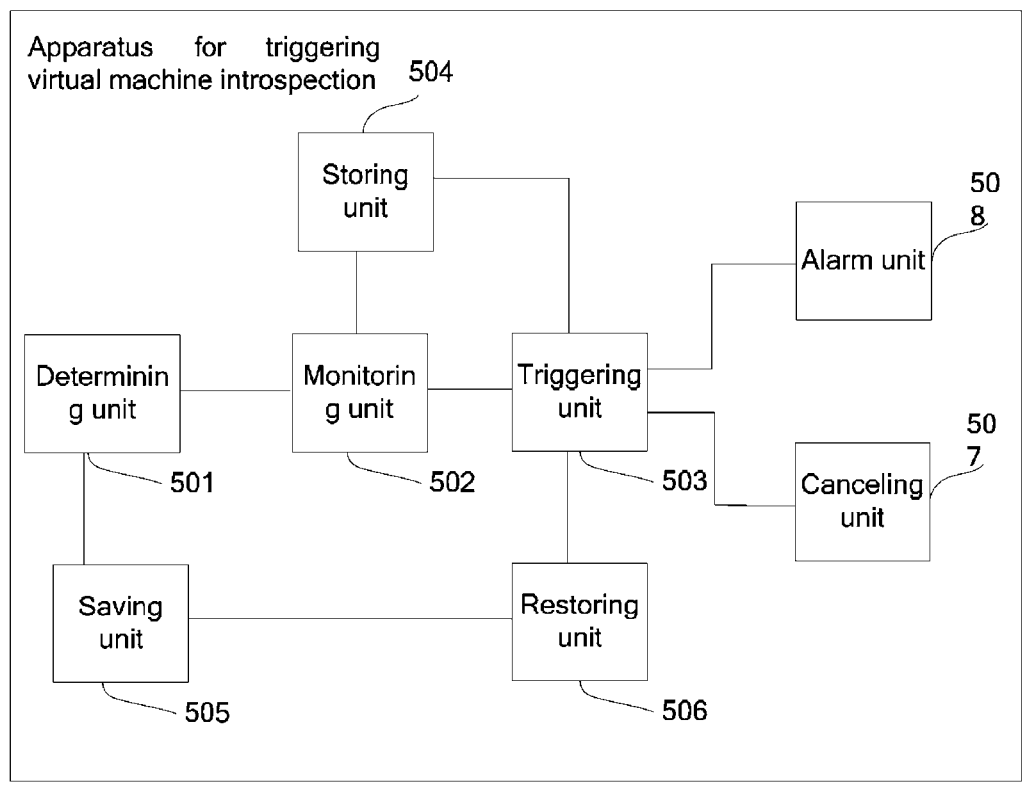

Still further, the apparatus further includes an alarm unit 508, as shown in FIG. 5E, where:

the alarm unit 508 is specifically configured to, when the triggering unit 503 triggers the virtual machine introspection, send an alarm prompt to a virtual machine user, so that the user performs a security check.

Figure 6:
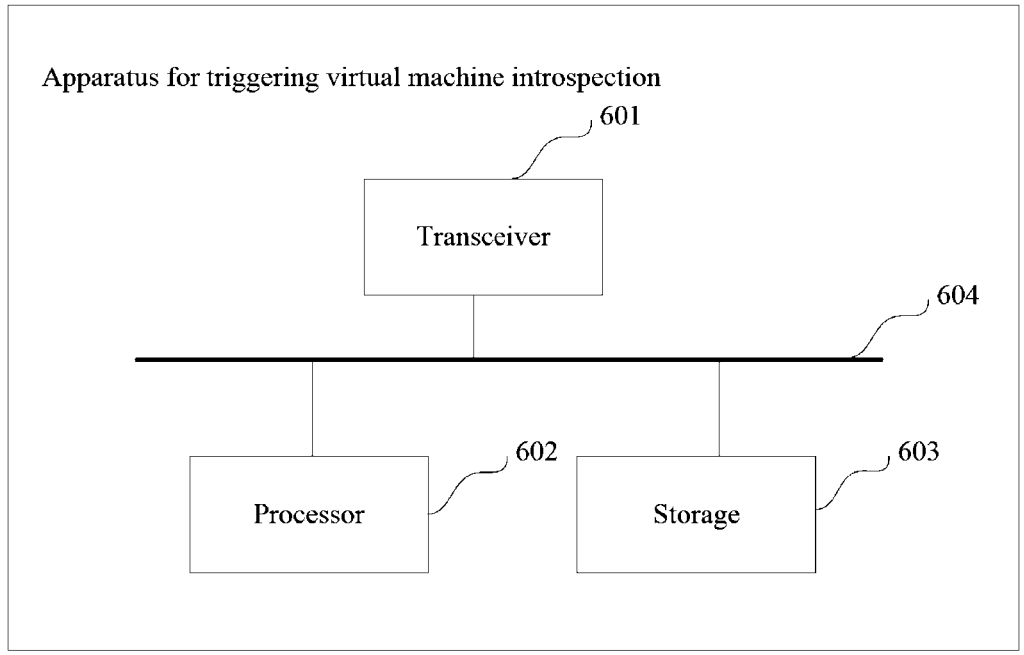
FIG. 6 is another schematic composition diagram of an apparatus for triggering virtual machine introspection according to an embodiment of the present invention.

Based on the foregoing related apparatus for triggering virtual machine introspection, an embodiment of the present invention further provides an apparatus for triggering virtual machine introspection. As shown in FIG. 6, the apparatus includes: a transceiver 601, a processor 602, a storage 603, and a bus 604, where all the transceiver 601, the processor 602, and the storage 603 are connected to the bus 604.

The processor 602 is configured to: acquire, by using the transceiver 601, determined data that needs to be protected; monitor the data that needs to be protected; and trigger virtual machine introspection when it is determineed that the data that needs to be protected is modified.

The processor 602 completes execution of the foregoing process generally under the control of one or more software programs, where the one or more software programs are stored in the storage 603. When the processor 602 needs to execute the foregoing process, the one or more software programs are invoked to the processor 602, and the foregoing process is completed under the control of the processor 602. Certainly, the foregoing process executed by the processor 602 may also be implemented by using hardware, which is not limited in this embodiment of the present invention.

The apparatus for triggering virtual machine introspection provided in this embodiment of the present invention may be configured to perform the methods for triggering virtual machine introspection shown in FIG. 1A-FIG. 4. Therefore, if the descriptions of the apparatuses for triggering virtual machine introspection shown in FIG. 5A-FIG. 5E and FIG. 6 are not detailed, reference may be made to the descriptions shown in FIG. 1A-FIG. 4.

It should be noted that the apparatus for triggering virtual machine introspection provided in this embodiment of the present invention may be an independent component, and may also be a component integrated in a VMI system, which is not limited in this embodiment of the present invention.

The apparatus for triggering virtual machine introspection provided in this embodiment of the present invention monitors determined data that needs to be protected, and triggers virtual machine introspection when it is determineed that the data that needs to be protected is modified, which can timely trigger virtual machine introspection. Further, in this embodiment of the present invention, the data that needs to be protected is monitored by using a hardware transactional memory. Because the hardware transactional memory has a characteristic of redirecting a program to a memory access violation processing program in a case of a multicore memory access violation, in this embodiment of the present invention, data protection is executed by using the hardware transactional memory on the data that needs to be protected, and when it is determined that the data that needs to be protected is modified, virtual machine introspection is triggered, so that when the data that needs to be protected is modified, the hardware transactional memory timely redirects a program to a violation processing program for triggering virtual machine introspection; and a time interval for performing a security check does not need to be set, thereby avoiding a performance loss and a security problem that are brought about during a regular check. In addition, a data protection transaction can be performed on any data that needs to be protected, and no limitation is constructed on data that VMI protects; and an operating system does not need to be modified either, and embodiments of the present invention does not rely on security of the operating system itself, and therefore, embodiments of the present invention is more applicable.

Figure 7:
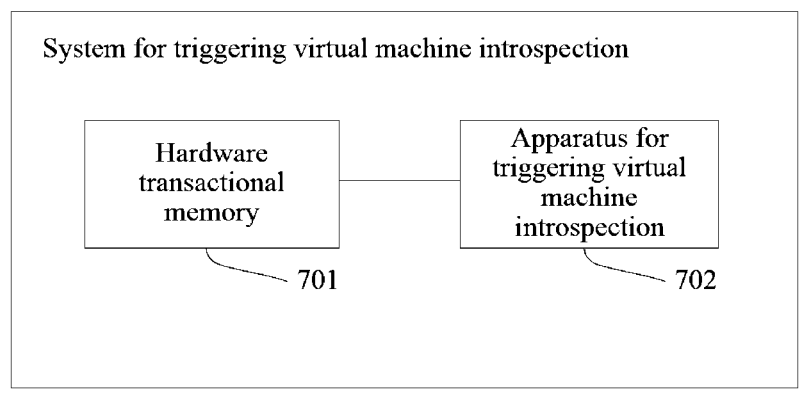
FIG. 7 is a schematic composition diagram of a system for triggering virtual machine introspection according to an embodiment of the present invention.

Based on the foregoing related method and apparatus for triggering virtual machine introspection, an embodiment of the present invention further provides a system for triggering virtual machine introspection. As shown in FIG. 7, the system includes a hardware transactional memory 701 and an apparatus for triggering virtual machine introspection 702, where:

the hardware transactional memory 701 is configured to monitor data that needs to be protected and is determined by the apparatus for triggering virtual machine introspection 702; and the apparatus for triggering virtual machine introspection 702 triggers virtual machine introspection when the hardware transactional memory 701 determines that the data that needs to be protected is modified.

It should be noted that the related apparatus for triggering virtual machine introspection 702 in this embodiment of the present invention has all functions of the related apparatus for triggering virtual machine introspection shown in FIG. 5A-FIG. 5E. For details, reference may be made to the descriptions shown in FIG. 5A-FIG. 5E, and details are not described herein again.

According to the system for triggering virtual machine introspection provided in this embodiment of the present invention, data protection is executed by using a hardware transactional memory on data that needs to be protected, and when it is determineed that the data that needs to be protected is modified, virtual machine introspection is triggered. Because the hardware transactional memory has a characteristic of redirecting a program to a memory access violation processing program in a case of a multicore memory access violation, in this embodiment of the present invention, data protection is executed by using the hardware transactional memory on the data that needs to be protected, and when it is determined that the data that needs to be protected is modified, virtual machine introspection is triggered, so that when the data that needs to be protected is modified, the hardware transactional memory timely redirects a program to a violation processing program for triggering virtual machine introspection; and a time interval for performing a security check does not need to be set, thereby avoiding a performance loss and a security problem that are brought about during a regular check. In addition, a data protection transaction can be performed on any data that needs to be protected, and no limitation is constructed on data that VMI protects; and an operating system does not need to be modified either, and embodiments of the present invention does not rely on security of the operating system, and therefore, embodiments of the present invention is more applicable.

It is apparent that a person skilled in the art can make various modifications and variations to the present invention without departing from the spirit and scope of the present invention. In this way, the present invention is intended to cover these modifications and variations if these modifications and variations fall within the scope defined by the claims of the present invention or their equivalent technologies.

What is claimed is:

1. A method for triggering virtual machine introspection, comprising:
    determining data that needs to be protected;
    storing, in a read set of a hardware transactional memory, a memory address corresponding to the determined data that needs to be protected;
    monitoring whether a write operation is executed on the data that needs to be protected and corresponds to the memory address stored in the read set; and
    controlling a transaction processing program of the hardware transactional memory to trigger virtual machine introspection, when it is determined that a write operation is executed on data that needs to be protected.

2. The method according to claim 1, wherein before monitoring the data that needs to be protected, the method further comprises saving a copy of the data that needs to be protected,
    wherein triggering virtual machine introspection comprises locating a memory address of modified data, and wherein after triggering virtual machine introspection, the method further comprises restoring the modified data according to the copy and the memory address of modified data.

3. The method according to claim 1, wherein after triggering virtual machine introspection, the method further comprises canceling monitoring of the data that needs to be protected.

4. The method according to claim 1, wherein after triggering virtual machine introspection, the method further comprises sending an alarm prompt to a virtual machine user.

5. A non-transitory computer readable medium including computer-executable instructions for execution on an apparatus for triggering virtual machine introspection, such that when the computer-executable instructions are executed by the apparatus a method is carried out comprising:
   determining data that needs to be protected;
   storing in a read set of a hardware transactional memory, a memory address corresponding to the data that needs to be protected;
   monitoring whether a write operation is executed on the data that needs to be protected and corresponds to the memory address stored in the read set; and
   controlling a transaction processing program of the hardware transactional memory to trigger virtual machine introspection, when it is determined that the write operation is executed on the data that needs to be protected.

6. The non-transitory computer readable medium according to claim 5, further including computer-executable instructions comprising:
   saving a copy of the data that needs to be protected;
   restoring a modified data according to the saved copy of the data that needs to be protected and the memory address of the modified data, wherein the modified data is the data that needs to be protected on which a write operation has been executed; and
   wherein the triggering locates the memory address of the modified data.

7. The non-transitory computer readable medium according to claim 5, further including computer-executable instructions comprising, when the virtual machine introspection is trigged, cancelling monitoring of the data that needs to be protected.

8. The non-transitory computer readable medium according to claim 5, further including computer-executable instructions comprising, after the virtual machine introspection is triggered, sending an alarm prompt to a virtual machine user.

9. A system for triggering virtual machine introspection, comprising:
   a hardware transactional memory configured to monitor data that needs to be protected; and
   a non-transitory computer readable medium including computer-executable instructions for execution on an apparatus for triggering virtual machine introspection such that when the computer-executable instructions are executed by the apparatus a method is carried out comprising:
      determining data that needs to be protected;
      storing, in a read set of a hardware transactional memory, a memory address corresponding to the determined data that needs to be protected;
      monitoring whether a write operation is executed on the data that needs to be protected and corresponds to the memory address stored in the read set; and
      controlling a transaction processing program of the hardware transactional memory to trigger virtual machine introspection, when it is determined that a write operation is executed on data that needs to be protected.

10. The system according to claim 9, further including computer-executable instructions comprising:
    saving a copy of the data that needs to be protected;
    locating a memory address of modified data; and
    restoring the modified data according to the copy saved by the saving instruction and the memory address of the modified data.

11. The system according to claim 9, further including computer-executable instructions comprising cancelling, when the virtual machine introspection is triggered, monitoring of the data that needs to be protected.

12. The system according to claim 9, further including computer-executable instructions comprising, when the virtual machine introspection is triggered, sending an alarm prompt to a virtual machine user.

* * * * *